United States Patent Office 3,337,706
Patented Aug. 22, 1967

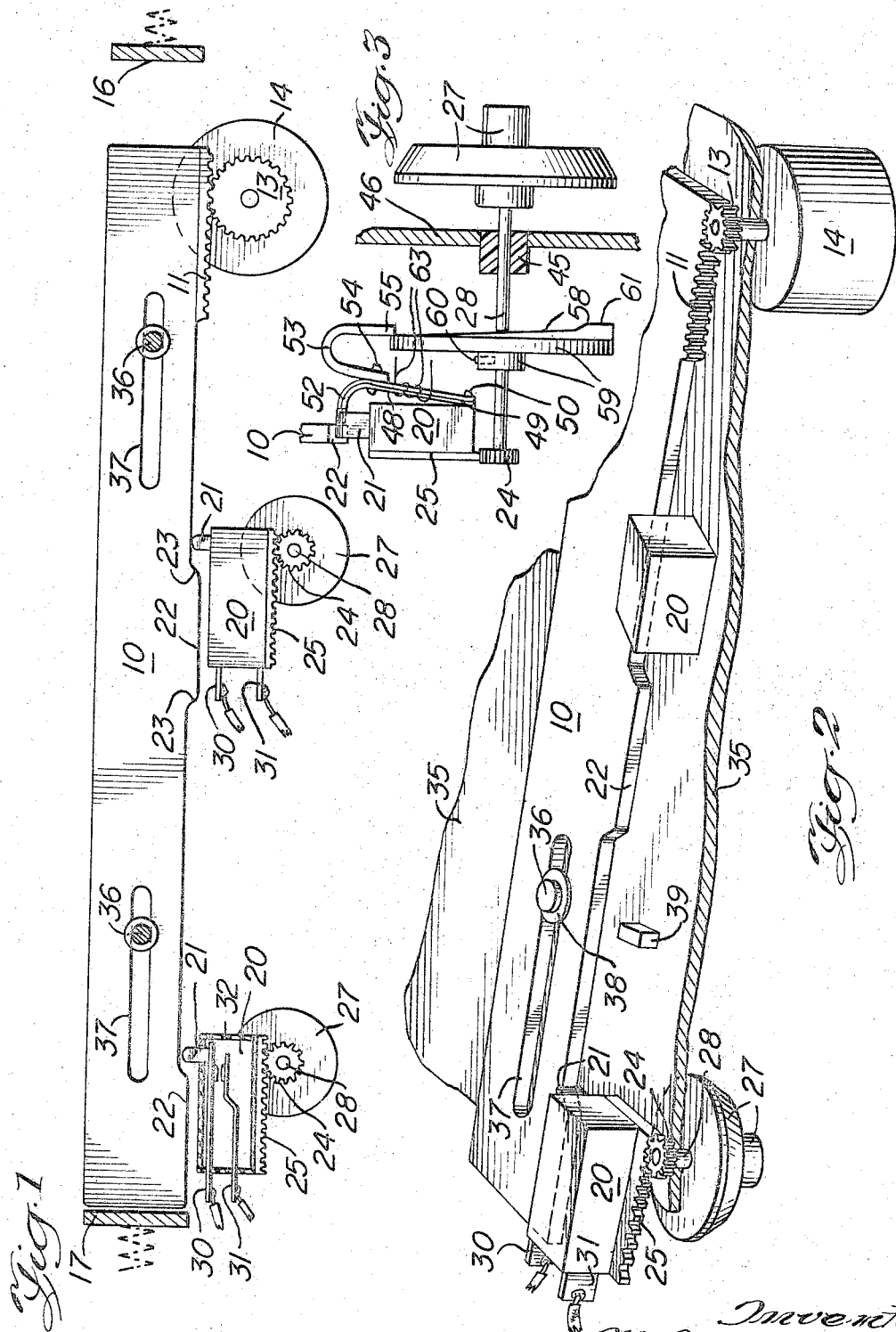

3,337,706
TIMING DEVICE
Melvin A. Lace, Prospect Heights, Ill., assignor to Oak Electro/Netics Corp., a corporation of Delaware
Filed May 14, 1965, Ser. No. 455,779
11 Claims. (Cl. 200—136)

This invention relates to a timing device, and more particularly to a timing device especially adapted for controlling the amount of power coupled to an electrical heating element.

In electrical heating systems, as a range or oven, the operating temperature of an electrical heating element is controlled by passing variable amounts of electric power to the element. For this purpose, an electrical switch is actuated for a predetermined portion of time during a recurring time period. The precentage of time that the switch is actuated, i.e., the duty cycle, is controlled by a timing device.

Different percentage values for the duty cycle each represent a different steady state operating temperature for the electrical heating element. In an electrical heating system, it is desirable that the desired operating temperature be quickly reached when the system is first turned on. For this purpose, a "flash" system is provided to override the normal heat control system by continuously delivering power to the heating element until the desired operating temperature is reached. At this point, the flash system is disconnected from the heating control, and the electrical switch, controlled by the timing device, is operative to gate the correct amount of power to the heating element, thereby maintaining the final desired operating temperature.

Prior heat controls have often utilized a bi-metallic element to control the duty cycle of an electrical switch. Such controls are only stable in a limited range of temperatures, and have an erratic operation when a wide range of temperatures is to be provided. The timing devices used in other prior systems have utilized a motor rotating continuously in one direction, which is, therefore, particularly susceptible to wear. Additionally, some prior heat controls have been unable to provide accurate control over the final operating temperature of the electrical heating element. As a result, such systems must be calibrated to cover a range of temperatures which are imprecisely designated, as, for example, the low, medium and high temperature designations on many electrical control systems.

The novel timing device disclosed herein is specially adapted for use in a heat control with an overriding flash system. However, the invention is not to be limited to such use as other applications will be apparent.

A principal object of this invention is to provide an improved timing device which accurately controls the duty cycle of an electrical switch.

Another object of this invention is to provide a novel timing device for use in a heat control system.

One feature of this invention is the provision of a heat control system in which the amount of power delivered to heating elements is infinitely and accurately variable between a minimum of zero percent, and a maximum, as one hundred percent of the available power.

Another feature of this invention is the provision of a heat control system in which the amount of power gated to heating elements is directly proportional to the rotation of a control dial.

A further feature of this invention is the provision of a heat control system which is calibrated with the same accuracy at both low and high heat levels. Equal increments of rotation of the control knob provide an equal change in the duty cycle of an electrical switch regardless of the relative position of the knob.

Still another feature of this invention is the provision of a timing device utilizing a reciprocating member having a cam surface thereon for engaging an actuating member of an electrical switch. The duty cycle of the switch is varied by varying the position of the switch itself.

Yet a further feature of this invention is the provision of a novel flash control system which causes an electrical switch to be continuously actuated until the desired operating temperature is reached.

And a further feature of this invention is the provision of a flash control system in which the pressure on a bi-metallic element is relieved during a portion of every period of operation. This relief allows the bi-metallic element to assume a new position which is accurately representative of the operating temperature of the electrical heating element associated therewith.

Further features and advantages of the invention will be apparent from the following specification and from the drawings, in which:

FIGURE 1 is a top view, partly in section, of a preferred embodiment of the invention;

FIGURE 2 is a perspective view of the invention generally shown in FIGURE 1; and FIGURE 3 is a side view, partly in section, of a modification of the invention embodying a flash control system.

While illustrative embodiments of the invention are shown in the drawings and will be described in detail herein, the invention is susceptible of embodiments in many different forms, and it should be understood that the present disclosure is to be considered as an exemplification of the principles of the invention and is not intended to limit the invention to the embodiments illustrated. The scope of the invention will be pointed out in the appended claims.

Turning now to FIGURES 1 and 2, a rack member 10 having teeth 11 thereon is longitudinally driven by means of a pinion 13 rotated by a motor 14. The motor is a bi-directional self-starting motor which, when constrained from rotation in one direction, will begin rotation in the opposite direction. Stop means, diagrammatically illustrated by surfaces 16 and 17, are provided to abut the ends of the rack 10. This abutment causes the motor 14 to stop rotation in the direction it was moving, and begin rotation in the reverse direction, thereby driving rack 10 toward the other abutment surface. As a result, rack 10 reciprocates between the surfaces 16 and 17.

Two electrical switches 20 are illustrated, each having an actuating means in the form of a plunger 21 located in the path of a cam surface 22 provided on rack 10. As the steep rise surface 23 of cam 22 engages plunger 21, the switch will be actuated. It should be noted that as many switches as desired may be provided in accordance with this invention. These switches may be actuated by additional cam surfaces on rack 10 or on other racks which also can be driven by motor 14 through a suitable gear arrangement.

In order to vary the duty cycle of switch 20, the whole switch itself is moved by means of a gear 24 which meshes with a gear rack 25 attached to switch 20. A control knob 27 connected through shaft 28 to gear 24 allows switch 20 to be manually moved to different longitudinal positions. In the position illustrated in FIGURE 1, it will be observed that switch 20 is actuated by surface 22 during almost the whole cycle of reciprocation of rack 10. By rotating gear 24 counterclockwise as viewed in FIGURE 1, plunger 21 may be moved to the left so as to be continually depressed by surface 22. Similarly, by rotating gear 24 fully clockwise, plunger 21 will be moved to a position in which surface 22 will not engage plunger 21 at any time during the period of the reciprocating rack 10. This position represents the full "off" position for the system.

The duty cycle of switch 20 is infinitely variable between zero percent and one hundred percent of the period of the reciprocating rack 10 by positioning the switch through the rotation of knob 27 to different points between the full "on" and "off" positions. Since equal angular increments of rotation of the control knob 27 will move switch 20 by equal incremental amounts, the knob 27 can be directly calibrated with indicia having equal spacing for equal changes in the duty cycle.

A cross-sectional view of an illustrative electrical switch 20 is shown in FIGURE 1. A pair of electrical contacts 30 and 31 are mounted within a base housing 32. The switch illustrated normally exhibits an open circuited electrical condition between the electrical contacts 30 and 31. As plunger 21 is depressed by cam 22, contact 30 will be urged into engagement with contact 31, thereby actuating the switch and producing a closed circuited electrical condition between the contacts. These contacts may be coupled to an electrical heating element (not illustrated) to gate electrical power thereto during the portion of each cycle of the reciprocating rack 10 in which cam surface 22 engages plunger 21, i.e., the duty cycle. Of course, switch 20 may have any known configuration, e.g., normally closed contacts which are open circuited when plunger 21 is engaged, and the exact configuration as such forms no part of this invention.

Knob 27 may be marked with indicia to indicate accurately the duty cycle of the switch controlled thereby. Since the duty cycle is directly proportional to the amount of power gated to the heating elements, and hence to the steady state operating temperature of the heating elements, the knob may be directly calibrated in temperature. Following the teachings of this invention, heat control systems can be mass produced in which the actual operating temperature is within one percent of the calibrated temperature on the knob. While switch 20 is particularly adapted for controlling the amount of power passed to electrical heating elements, the invention is not limited thereto, and other uses will be apparent to those skilled in the art.

In order to produce an extremely accurate timing device, the bi-directional self-starting motor 14 is preferably a synchronous motor having a permanent magnet stator and a salient pole rotor. With such a construction, the motor 14 will reach synchronous speed almost immediately upon energization. Furthermore, due to the low torque and low inertia rotor, the sudden stop caused by the impact of rack 10 with one of the stop surfaces 16 or 17 is not destructive to the motor. Such a motor is fully disclosed in a co-pending application of Melvin A. Lace, "Motor," Ser. No. 411,986, filed Nov. 18, 1964, and assigned to the assignee of this invention.

The stop surfaces 16 and 17 may be mounted by means of springs (illustrated in broken lines) which will cushion the impact of rack 10 thereagainst and cause the rack to rebound, thereby aiding the reversal of motor 14. With the motor and stop surface construction described, rack 10 will exhibit an essentially constant velocity motion, thereby producing a timing device in which the duty cycle of switch 20 is linearly related to the location of the switch.

The "off" time stop spring will also compensate for voltage variations which cause the heating rate to vary. An increased voltage will cause the motor torque to increase, driving rack 10 against the spring loaded surfaces with more force, urging them further apart. As a result, the period will be increased slightly since the rack reciprocates through a longer path. If the voltage (and torque) decreases, the path is shortened. If the stop controlling the "off" period is allowed to deflect more than the stop controlling the "on" period, the duty cycle will be varied proportionately to the change in driving voltage. The energy (power x time) input to the heating element tends to remain constant. The "on" time stop spring is not actually needed to achieve the compensation, in fact, would somewhat detract from it.

In FIGURE 2, the timing device of FIGURE 1 is illustrated in more detail. A base 35, as a portion of a mounting surface on an electrical heating appliance, supports the timing structure. A pin 36, mounted to base 35 and extending thereabove, is located in a longitudinal slot 37 in rack 10. A washer 38, held under the head of pin 36, confines rack 10 to longitudinal motion.

A stop 39, attached to base 35, is provided to limit the motion of switch 20. Similar stops may be provided to limit the motion of switch 20 in the opposite direction. The switch 20 and gear track 25 may be slidably mounted for longitudinal motion in a manner similar to that provided for rack 10.

As previously noted, when switch 20 is moved to its extreme left-hand position as viewed in FIGURES 1 and 2, the switch will remain actuated regardless of the position of rack 10. Similarly, when switch 20 is moved to the extreme right-hand position, the switch cannot be actuated by rack 10. Therefore, the heating elements connected to switch 20 may be turned fully on or off independent of the reciprocating motion in rack 10. While it is unlikely that motor 14 and its associated drive structure would fail, the system disclosed allows the electric heating elements to be used even in case of a motor or drive system failure.

In FIGURE 3, a modification of the invention is illustrated incorporating a flash heat control system. The shaft 28 of knob 27 is rotatably held in a collar 45 affixed to a suitable base plate 46. A bi-metallic element 48 has one end 49 fixedly attached by means of a rivet 50 to the lower portion of switch 20. The other end 52 of element 48 is free to move as the temperature of the bi-metallic element 48 changes. When element 48 is cool, end 52 assumes the position illustrated in FIGURE 3 by the solid and dotted lines. In the cool position, plunger 21 will be held depressed by end 52, in a manner to be described hereinafter.

A U-shaped bracket 53 is attached by means of a rivet 54 to bi-metallic element 48. The free end 55 of bracket 53 rests against a cam surface 58 on the face of a wheel 59 secured to shaft 28 by a set screw 60. Cam surface 58 slowly rises from the face of wheel 59 to a maximum height indicated by section 61. Thus, cam 58 has a generally rising spiral shape which causes end 52 to be withdrawn off plunger 21 as wheel 59 is rotated about shaft 28 by knob 27. When surface 61 is rotated under end 55, end 52 will be completely withdrawn off plunger 21. This position corresponds to the "off" position of the heat control, and switch 20 would be located to the extreme right as viewed in FIGURE 1.

In the position illustrated in FIGURE 3, shaft 28 has been rotated almost fully counterclockwise and switch 20 is in the position illustrated in FIGURE 1.

The bi-metallic element 48 is heated by any suitable means so that its temperature corresponds to the temperature of the electrical heating element coupled to switch 20. For example, a heating coil 63 which encircles element 48 may be connected to the same source of power (not illustrated) supplied to the heating element.

The operation of the flash control system is as follows. When the heating system is first turned on by rotating knob 27, for example, to the position illustrated in FIGURE 3, end 52 will move over the top of plunger 21 if surface 22 is at that instant depressing the plunger. If surface 22 is in the position illustrated in FIGURE 1, the reciprocating rack 10 will soon cause plunger 21 to be depressed, thereby allowing end 52 of bi-metallic element 48 to snap into position over the depressed plunger.

As cam surface 22 is moved out of engagement with plunger 21, end 52 remains over the top of the plunger, holding it depressed. Therefore, switch 20 remains actuated and power is continuously supplied to the heating elements, causing them to rise quickly to the desired operating temperature chosen by rotation of knob 27.

During this same time, bi-metallic element 48 is also continuously heated, causing end 52 to expand away from its cool position, in a manner well known in the art. When the desired operating temperature is just reached, end 52 is completely withdrawn off plunger 21, thereby releasing the plunger. Switch 20 is now actuated in accordance with the motion of rack 10 and the position of the switch, thereby maintaining the heating element at the desired operating temperature just reached.

The flash heat control described is automatically disengaged from switch 20 when the operating temperature set by knob 27 is reached.

End 52 when cool overlaps plunger 21 by a fixed distance illustrated by the dotted lines in FIGURE 3. As knob 27 is rotated clockwise, the rising cam surface 58 will withdraw end 52 from its cool position, thereby automatically adjusting the position of bi-metallic element 58 so that a lower temperature will release plunger 21.

With the novel flash control illustrated, switch 20 is continuously actuated until the desired operating temperature is reached. Furthermore, the flash control is operative during the whole range of temperatures provided by knob 27. With the construction illustrated, a flash control may be provided for any one or any number of controls associated with the heating control system.

It should be noted that the bottom of end 52 of bi-metallic element 48 is slightly higher than the bottom surface of cam 22. When cam 22 is moved into engagement with plunger 21, the pressure on end 52 is relieved, allowing the bi-metallic element to assume a new position accurately representative of the temperature generated by heating coil 63. In practical systems, temperature compensation has not been necessary for the bi-metallic element due to the construction illustrated.

I claim:

1. A timing device for periodically actuating a switch, comprising: a member having a cam surface thereon; means for producing a reciprocating motion in said member through a substantially fixed distance path; an electrical switch having electrical contacts maintained in a first electrical condition and actuating means positioned in the path of the reciprocating cam surface for engagement therewith, causing said contacts to assume a second electrical condition; and adjustable means for moving the position of said electrical switch along said path, thereby varying the position of said actuating means in said substantially fixed distance path to vary the duty cycle without effecting the period of said switch.

2. A timing device for periodically actuating a switch, comprising: a member having a cam surface thereon; means for producing a reciprocating motion in said member along a path of travel; an electrical switch having electrical contacts maintained in a first electrical condition and actuating means positioned in the path of the reciprocating cam surface for engagement therewith, causing said contacts to assume a second electrical condition; and adjustable means for moving said switch parallel to said path of travel to vary the position of said actuating means in said path so that movement of said switch by equal increments linearly changes the duty cycle of said switch.

3. A timing device for periodically actuating a switch, comprising: a member having a cam surface thereon; means for producing a reciprocating motion in said member; an electrical switch having electrical contacts maintained in a first electrical condition and actuating means positioned in the path of the reciprocating cam surface for engagement therewith, causing said contacts to assume a second electrical condition; and adjustable means for varying the position of said actuating means in said path to vary the duty cycle of said electrical switch throughout a range from the continual maintenance of one of said electrical conditions to the maintenance of the other of said electrical conditions for more than 50 percent of the time, all of the duty cycles in said range occurring while said member is reciprocating.

4. A timing device for periodically actuating a switch, comprising: a bi-directional self-starting motor which, when constrained from rotation in one direction, will rotate in the opposite direction; a member having a cam surface thereon; means connecting said member to said motor for movement thereby; stop means having surfaces located to abut said member, the abutment of said member with one of said surfaces causing said motor to stop rotation in the one direction and begin rotation in the opposite direction, producing thereby a reciprocating motion in said member; an electrical switch having a base with electrical contacts mounted thereon maintaining a first electrical condition, a plunger movably mounted on said base and positioned in the path of the reciprocating cam surface for engagement therewith to depress the plunger, causing said electrical contacts to assume a second electrical condition; and adjustable means rotated to vary the position of said base, thereby varying the position of said plunger in the path of said reciprocating cam surface, wherein rotation of said adjustable means by equal increments linearly changes the duty cycle of said switch.

5. The timing device of claim 4 wherein said adjustable means includes a rotatable shaft having a gear thereon meshed into engagement with a gear rack on said switch base.

6. In an electrical heating system in which the operating temperature is dependent upon the duty cycle of an electrical switch, a heat control for quickly reaching any desired operating temperature in a range of temperatures, comprising: a member having a cam surface thereon; means for producing a reciprocating motion in said member; an electrical switch having electrical contacts maintained in a first electrical condition and actuating means positioned in the path of the reciprocating cam surface for engagement therewith to change said electrical contacts to a second electrical condition; adjustable means for varying the relative position of engagement of said actuating means with said cam surface, the movement of said adjustable means between a first and a second position varying the duty cycle of said switch between values corresponding to said range of temperatures; and means associated with said adjustable means for maintaining said electrical contacts in said second condition until the desired operating temperature chosen by said adjustable means is reached and thereafter being inoperative to effect the duty cycle of said electrical switch.

7. In an electrical heating system wherein the operating temperature is dependent upon the duty cycle of an electrical switch, a heat control for quickly reaching and maintaining any desired operating temperature in a range of temperatures, comprising: a member having a cam surface thereon; means for producing a reciprocating motion in said member; an electrical switch having electrical contacts maintained in a first electrical condition and actuating means positioned in the path of said reciprocating cam surface for engagement therewith to change said electrical contacts to a second electrical condition; adjustable means rotatable for varying the position of said electrical switch to vary the position of engagement of said actuating means with said cam surface, in which equal increments of rotation linearly changes the duty cycle of said switch; and flash means associated with said adjustable means, having a bi-metallic controlled element positioned to engage said actuating means until the desired operating temperature chosen by the adjustable means is reached, said bi-metallic controlled element moving out of engagement with said actuating means when said desired operating temperature is reached to no longer affect the duty cycle of said switch.

8. In an electrical heating system in which the operating temperature is dependent upon the duty cycle of an electrical switch, a heat control for quickly reaching and maintaining an operating temperature continuously adjustable in a range of temperatures, comprising: a member having a cam surface thereon; means for producing a reciprocating motion in said member; an electrical switch having electrical contacts maintained in a first electrical condition, plunger means positioned in the path of the reciprocating cam surface for engagement therewith to cause said electrical contacts to assume a second electrical condition; adjustable means rotatable for varying the position of said electrical switch to vary the position of engagement of said plunger with said cam surface, the rotation of said adjustable means between a first and a second position thereby continuously changing the duty cycle of said switch; bi-metallic flash means positioned to engage and hold said plunger in its depressed position for maintaining said electrical contacts in said second electrical condition, an end of said bi-metallic means being located when cool a fixed distance from the end of the plunger, cam means rotated by said adjustable means for withdrawing said end to diminish said fixed distance, allowing the bi-metallic means to move out of engagement with said plunger when the operating temperature set by said adjustable means is reached.

9. The heat control of claim 8 wherein said flash means comprises a bi-metallic element having a first end attached to said switch and a second end free to move in response to the temperature of said element, said cam means includes a cam having a raised surface which rotates with the rotation of said adjustable means and a member having a first end connected to said bi-metallic element and a second end positioned on said raised surface for withdrawing the second end of said bi-metallic element from its position of full engagement with said plunger when said adjustable means is rotated, for maintaining said electrical contacts in said second electrical condition until the desired temperature chosen by rotation of said adjustable means is reached, at which time said second end of said bi-metallic element releases said plunger to allow only said cam surface and the position of said switch to control the duty cycle of said switch.

10. A timing device for periodically actuating a switch, comprising: a member having a cam surface thereon; means for producing a reciprocating motion in said member; an electrical switch which controls the energy input to a load and having electrical contacts maintained in a first electrical condition and actuating means positioned in the path of a reciprocating cam surface for engagement therewith, causing said contacts to assume a second electrical condition; adjustable means for varying the position of said electrical switch, thereby varying the position of said actuating means in said path to vary the duty cycle of said switch; and means provided to vary the duty cycle of the switch inversely with respect to the voltage applied to the load.

11. The timing device of claim 10 wherein said member is reciprocated between stops by a reversible motor having a torque directly proportional to the applied voltage, and the stop determining the open period of said switch is resilient.

References Cited

UNITED STATES PATENTS

| | | |
|---|---|---|
| 671,106 | 4/1901 | Cowperthwait. |
| 764,189 | 7/1904 | Hardy. |
| 1,599,507 | 9/1926 | Abrahamson _____ 200—33 |
| 2,034,865 | 4/1936 | Hart _____ 200—139 |
| 2,272,568 | 2/1942 | Little _____ 200—33 |
| 2,566,824 | 9/1951 | Carlson _____ 200—47 |
| 2,740,015 | 4/1956 | Vogelsberg _____ 200—122 |
| 2,748,219 | 5/1956 | Buchanan _____ 200—153 |
| 2,968,710 | 1/1961 | Horberg _____ 200—153 |
| 3,236,107 | 2/1966 | Magnusson _____ 74—107 |

FOREIGN PATENTS 962,981    7/1964    Great Britain.

BERNARD A. GILHEANY, *Primary Examiner.*

H. E. SPRINGBORN, *Assistant Examiner.*